United States Patent [19]

Benecke

[11] Patent Number: 5,182,910
[45] Date of Patent: Feb. 2, 1993

[54] MICROMECHANICAL MANIPULATOR

[75] Inventor: Wolfgang Benecke, Berlin, Fed. Rep. of Germany

[73] Assignee: Fraunhofer-Gesellschaft zur Forderung der angewandten Forschung e.V., Fed. Rep. of Germany

[21] Appl. No.: 714,389

[22] Filed: Jun. 7, 1991

[51] Int. Cl.$^5$ .............................. F03G 7/06
[52] U.S. Cl. ............................ 60/529; 251/11
[58] Field of Search ............ 251/11; 60/527, 528, 60/529

[56] References Cited

U.S. PATENT DOCUMENTS

| | | | |
|---|---|---|---|
| 1,258,368 | 3/1918 | Smith | 60/529 |
| 4,014,170 | 3/1977 | Kitterman | 60/529 |
| 4,864,824 | 9/1989 | Gabriel et al. | 60/527 |
| 5,029,805 | 7/1991 | Albarda et al. | 251/11 |
| 5,061,914 | 10/1991 | Busch et al. | 60/527 |
| 5,069,419 | 12/1991 | Jerman | 60/528 X |

Primary Examiner—Allen M. Ostrager
Attorney, Agent, or Firm—Harry M. Weiss; Antonio R. Durando

[57] ABSTRACT

Disclosed is a micromechanical manipulator composed of substrate 1, heating elements and a manipulator arm 2 which is based on the principle of the bimaterial effect. Prior art bimaterial manipulators execute movements perpendicular to the surface of the substrate. However, it is often desirable to have a manipulator which executes movements in the surface of the substrate. The invented manipulator is based on the substrate surface counteracting steering of the manipulator arm with mechanical resistance, which leads to bulging and shortening of the effective length of the arm and thereby to movement in the surface of the substrate. The invented manipulator arm is suited as a drive means for elements, such as toothed disks or joints, which are movably disposed in the surface of the substrate.

19 Claims, 3 Drawing Sheets

MICROMECHANICAL MANIPULATOR

TECHNICAL FIELD

The present invention relates to a micromechanical manipulator having a substrate, heating elements and at least one manipulator arm. The manipulator arm is composed of a plate and a layer which at least partially covers the plate. Movement of the manipulator arm is a result of the plate and the layer being made of different materials with varying thermal expansion coefficients. When the temperature changes, the fixedly connected materials expand differently thereby steering the manipulator arm (bimetal effect).

With the aid of micromanipulators, objects can be moved over microscopically small distances. For this reason, they are suited for precision adjustment. Micromanipulators may also be utilized as micro-valve caps, as microswitches or as micro-mirrors for light deflection.

STATE OF THE ART

Micromanipulators of this kind are described, e.g. in the journal "Micromechanical Membrane Switches on Silicon" (IBM Journal Research Development, Vol. 23, 1979, pp. 376-285) or in "Thermally Excited Silicon Microactuators" (IEEE Transactions on Electron Device, Vol. 35, 1988, pp 758-763). The state of the art micromanipulators have in common that movement of the manipulator arm comes out of the substrate surface; movement in the surface plane has hitherto not been possible.

The first-cited publication discloses a manipulator having a manipulator arm composed of two layers with varying thermal expansion coefficients. The arm is disposed at a small distance from the surface of the substrate and has a fixed end and a free end which executes a movement approximately perpendicular to the substrate surface when the temperatures changes.

Movable micromechanical elements such as joints or turbine wheels are known from several publications, by way of illustration, the patent specification of U.S. Pat. No. 4,740,410 or the publication "Micro-gears and Turbines Etched from Silicon" (Sensors and Actuators, 12, (1987), pp. 341-348). However, until now a drive means which is integrated on the same chip is lacking. The elements are moved, e.g. with the aid of a stream of air supplied from without.

DESCRIPTION OF THE INVENTION

The object of the present invention is to provide a micromechanical manipulator having a manipulator arm which is made on a bimaterial basis, is easy to produce and serves as a drive means for the moveable micromechanical elements integrated in a substrate surface.

The aforegoing object is fulfilled by a manipulator having a manipulator arm composed of a plate of a first material with a first thermal expansion coefficient and a layer of a second material with a second thermal expansion coefficient which at least partially covers the plate in that the layer has a higher expansion coefficient than the plate and that the manipulator arm has a first part, which is fixedly connected to the surface of the substrate and a second, free part and is disposed at a small distance parallel to the substrate surface in such a manner that the free part of the plate executes a movement parallel to the surface of the substrate when the temperature of the manipulator arm changes.

Advantageous embodiments and further improvements of the present invention consist of various specific applications wherein the micromechanical manipulator of the invention is used to provide linear motion, as set forth below.

Production engineering advantages are offered by the embodiment having the substrate, plate and layer of metal of the invention composed of a silicon wafer, polysilicon and gold, respectively, inasmuch as a base material which is frequently employed in microelectronics serves as the substrate.

The plate is made of polysilicon and the layer of metal. Metal, e.g. gold has a substantially higher thermal expansion coefficient than polysilicon. The combination of these two materials has a very marked bimaterial effect. Electric resistances disposed on the plate or on the layer serve as the heating element. Especially advantageous is an embodiment in which the plate itself or the layer or both serve as the heating resistance. All the components of the micromechanical manipulator can be integrated on a semiconductor chip. In this embodiment, the power supply for the heating elements and other electronic circuits can also be integrated on the same chip.

According to one embodiment of the invention, the plate of the manipulator arm is designed as an extended rectangle. With this shape an optimal effect of the varying thermal expansion coefficients is attained. According to a specific application of the invention, the micromechanical manipulator can be further improved to become a valve. The substrate in this further improvement has a valve opening which is closed by the free end of the manipulator arm as long as the arm is not heated. When the heating current is switched on, the arm opens the opening and switches the valve to passage. Analogously, the manipulator according to another application of the invention may serve as a shutter aperture for rays of particles or rays of light. Particularly advantageous further improvements are set forth in other applications described below, wherein the manipulator arm is designed as the drive means for a movable component and, in particular, wherein at least two manipulator arms are disposed tangentially about a rotating toothed disk to engage the teeth and cause the rotation of the disk. One or several micromanipulators serve herein as the drive means for the movable micromechanical components, such as joints, disks or gears.

The advantages attained with the present invention lie, in particular, in that movement occurs in the substrate plane. Thus movably disposed mechanical components can be driven in this plane. With the micromechanical manipulator a drive means is provided which makes micromechanical machines independent of external drives. The manipulator can be used in a great variety of ways as an optical element (variable shutter, variable mirror), as a valve for gases and fluids, as a switch and as a relay, as a drive means for translation and rotation movements. Since passively movable micromechanical components have already been realized, active drive means will gain in significance. They will be able to find advantageous use in microrobot engineering, in medical engineering and as a tool for manufacturing micromechanical components.

Three embodiments of the present invention are illustrated in the accompanying drawings and are made more apparent in the following section.

BRIEF DESCRIPTION OF THE DRAWINGS

FIG. 1b is a cross-sectional view of the same micromechanical manipulator illustrating an unheated manipulator arm, as seen from line 1b—1b in FIG. 1a.

MODES OF CARRYING OUT THE INVENTION

Figure 1A:
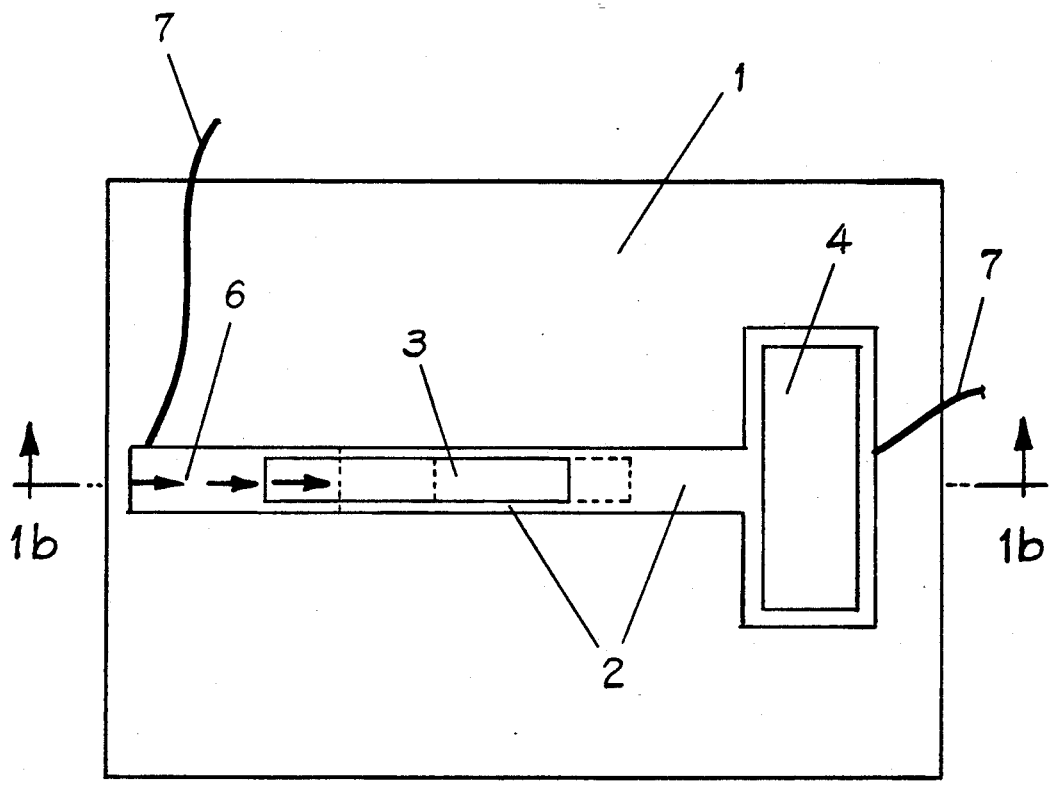
FIG. 1a shows a schematic representation in plan view of a micromechanical manipulator according to this invention.
Figure 1B:
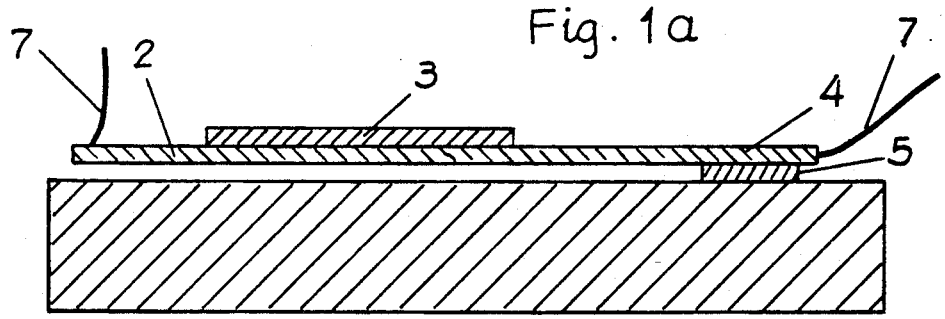
Figure 1C:
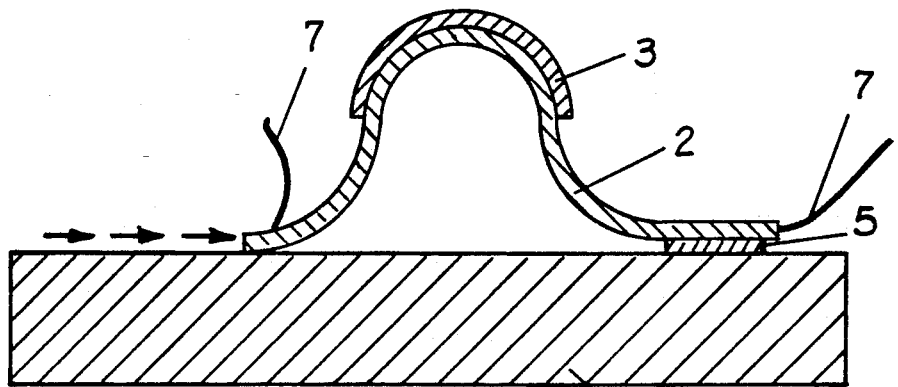
FIG. 1c is a cross-section taken from the same view of FIG. 1b illustrating a heated manipulator arm.

A cuboid made of a silicon wafer serves as the substrate 1 of the micromechanical manipulator depicted in FIG. 1. The length and the width of the cuboid are several hundred micrometers, the thickness corresponds to the wafer thickness of 500 μm. The manipulator arm is composed of a T-shaped approximately 0.5 m thick, polysilicon plate 2 and a metal layer 3 (e.g. gold) of approximately the same thickness. The metal layer partially covers the extended part of the T-shaped plate, both are fixedly connected to each other. For purposes of illustration, electrical wiring 7 is shown attached to both ends of the plate 2, so that the plate may be used as a heating resistance to provide the temperature variations required for practicing the invention.

In part of its traverse piece 4, plate 2 is fixedly connected to the substrate surface via an approximately 0.5 μm thin intermediate layer 5. The longitudinal piece 6 of the T-shaped plate is free.

The materials of the plate and the layer are selected in such a manner that steering of the manipulator arm when the temperature rises occurs in the direction of the substrate surface. Decisive for the function of the manipulator is that this movement perpendicular to the substrate surface is counteracted by a mechanical resistance. The occurrence of mechanical resistance causes the manipulator arm to bulge and the free end of the manipulator arm to move along the surface in the direction of the fixed end. This movement is indicated by arrows in FIG. 1a and FIG. 1c.

When the manipulator arm cools off, the movement along the surface runs in the opposite direction.

Figure 2A:
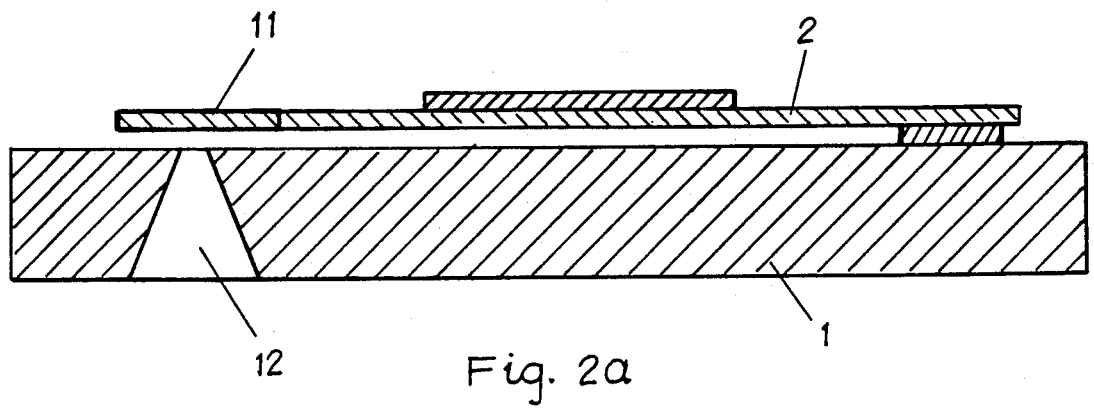
FIG. 2a shows a section through a micromechanical manipulator which is designed as a shutter or valve, illustrating the shutter or valve in a closed position.
Figure 2B:
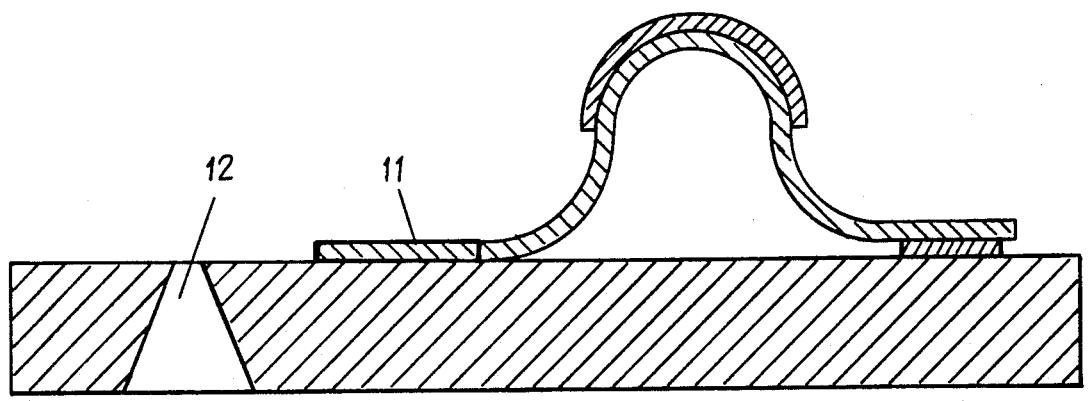
FIG. 2b illustrates the micromechanical manipulator of FIG. 2a with the shutter or valve in an open position.

FIG. 2 depicts the schematic representation of a further improvement of the micromanipulator into a closable shutter for rays of light or rays of particles. A cover plate 11 covering shutter aperture 12 in the substrate 1 (FIG. 2a) is disposed at the free end of the manipulator arm 2. The shutter aperture is opened (FIG. 2b) by heating the manipulator arm.

A further improvement of the manipulator in which two manipulator arms serve as a drive means for a movable toothed disk is shown in FIG. 3. Both the manipulator arms 21, 22 are disposed tangentially to the round disk 23 and encompass an angle of 90°. The free ends of the manipulator arms are designed as hooks 24 and can interact with the toothed disk. The toothed disk has six rod-shaped teeth 25, the length of which is selected in such a manner that a manipulator arm can only interact with a tooth when the latter points approximately in the direction of the manipulator arm. FIG. 3 A shows the starting position; both manipulator arm are extended, the tooth, indicated by an arrowhead, of the toothed disk points toward the manipulator arm 21.

Figure 3A:
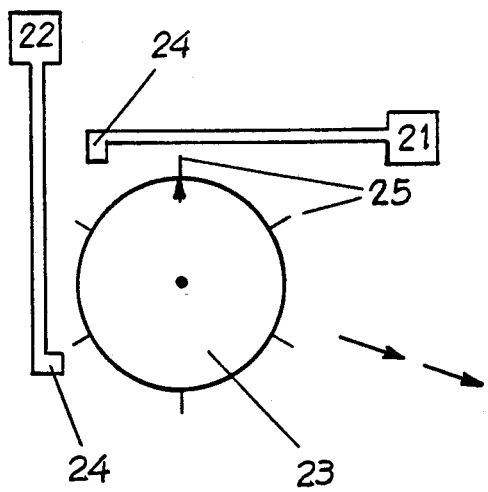
FIGS. 3A through 3E show various steps of a micromechanical manipulator in which two manipulator arms serve as a drive means for a toothed disk, illustrating the course of a 60° turn.
Figure 3B:
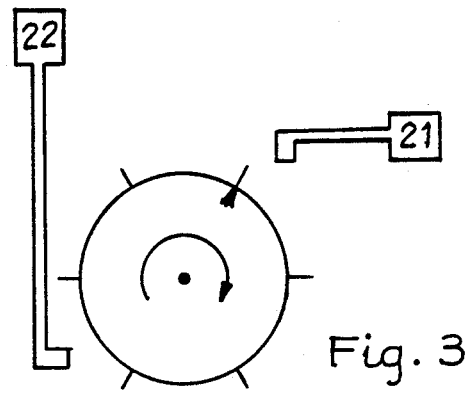
Figure 3C:
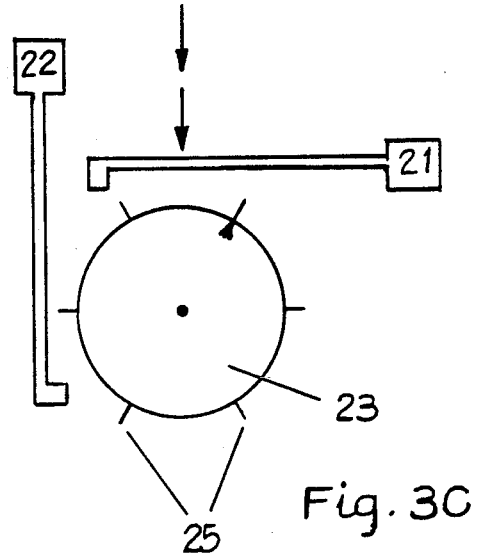

By heating the manipulator arm 21, its free end which is designed as a hook 24 moves along the substrate surface and guides the indicated tooth along until the latter is turned away from the sphere of influence of the arm by the turning motion of the toothed disk. As depicted in FIG. 3 B, another tooth points toward the manipulator 22 following this turning motion. In cooling off, the manipulator arm 21, as shown in FIG. 3C, returns to its original position without moving the toothed disk.

Figure 3D:
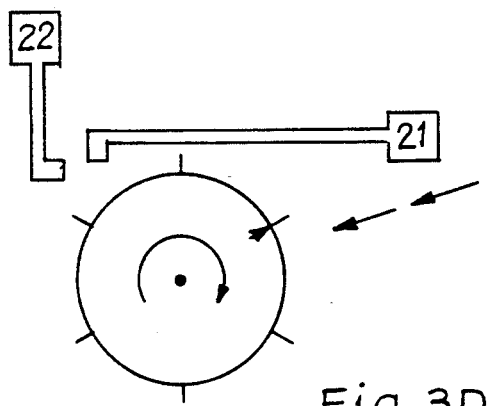
Figure 3E:
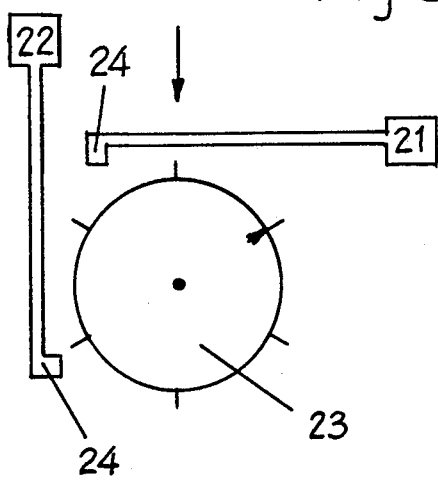

In the next step, the result of which is depicted in FIG. 3D, the toothed disk is turned another distance by the interaction of the manipulator arm 22. Following cooling off of the arm, the base position is returned to with the difference that the toothed disk is turned 60° (FIG. 3E). By continually running through the described steps, the toothed disk is put into rotation.

Higher turning speeds of the disk and an improved synchronization are achieved by disposing several manipulator arms and teeth.

In a further improvement, which is not described in more detail, the manipulator serves as a shutter for rays of particles or rays of light with a selectable shutter aperture. The toothed disk 23 is provided with shutter apertures of varying diameters, which are disposed on a circle around the center of the disk. At the same distance from the center of the disk, the substrate has an opening which is brought to coincide with a shutter aperture of the desired diameter by turning the disk.

In another embodiment, by way of illustration, cutting or milling tools are disposed on the toothed disk in such a manner that the manipulator is suited for processing material.

The rotation motions of one or several toothed disks are converted back to translation motions by an advantageous design of the manipulator. The teeth of the toothed disk engage the teeth of a toothed rectangular plate and move this plate in the substrate surface. By this means, translations can be attained over distances which surpasses the movement by a manipulator arm by far.

All the described embodiments are suited for fabrication with the usual processes of microstructure technology and microelectronics. In this manner, both the manipulator and a required control or evaluation electronics can be integrated on a chip. Several identical micromechanical manipulators can be fabricated simultaneously on a wafer in one production process.

What is claimed is:

1. A micromechanical manipulator having a substrate, at least one manipulator arm composed of a plate of a first material with a first thermal expansion coefficient and a layer of a second material with a second thermal expansion coefficient which is fixedly connected to and partially covers said plate, and heating means for varying the temperature of said manipulator arm; wherein said layer has a higher expansion coefficient than said plate; wherein said manipulator arm is disposed at a small distance in parallel to said substrate and has a first end, which is fixedly connected to the surface of the substrate, and a second, free end; and wherein said layer is disposed on said plate in such a manner that the movement of said free end resulting from temperature variations is counteracted by mechanical resistance posed by said substrate surface, so that said arm bulges perpendicularly to the substrate surface when the temperature rises, whereby said free end is urged towards and executes a movement parallel to the substrate surface in the direction of said fixed end, and so that the movement runs in reverse when the temperature drops.

2. A micromechanical manipulator according to claim 1, wherein said substrate is composed of a silicon wafer, said plate of polysilicon and said layer of a metal.

3. A micromechanical manipulator according to claims 1 or 2, wherein said heating means consists of at least one electric resistance disposed on said layer covering said plate.

4. A micromechanical manipulator according to claim 1, wherein all the components of said manipulator are integrated on a semiconductor chip.

5. A micromechanical manipulator according to claim 1, wherein said free end of said manipulator arm is designed as an extended rectangle.

6. A micromechanical manipulator according to claim 1, wherein said substrate has a valve opening beneath said free end of said manipulator arm and said free end of said manipulator arm is designed in such a manner that in an unheated state it closes said valve opening.

7. A micromechanical manipulator according to claim 1, wherein said substrate has at least one shutter aperture beneath said free end of said manipulator arm and said free end of said manipulator arm is designed in such a manner that in an unheated state it covers said shutter aperture.

8. A micromechanical manipulator according to claim 1, wherein said manipulator arm is designed as the drive means for a movable component.

9. A micromechanical manipulator according to claim 8, wherein at least two manipulator arms are disposed tangentially about a rotating toothed disk on a substrate and said free ends of said manipulator arms are designed as hooks which engage teeth of said toothed disk.

10. A micromechanical manipulator according to claim 9, wherein two micromanipultors are disposed perpendicular to one another tangentially about said rotating toothed disk and said toothed disk has six teeth evenly distributed around the circumference of said disk, the length of said teeth being selected in such a manner that a manipulator arm can engage a tooth only when the latter is pointing approximately in the direction of said manipulator arm.

11. A micromechanical manipulator according to claim 1, wherein said heating means consists of at least one electric resistance disposed on said plate.

12. A micromechanical manipulator according to claim 3, wherein said at least one electric resistance disposed on said layer covering said plate consists of the layer itself.

13. A micromechanical manipulator according to claim 2, wherein said metal consists of gold.

14. A micromechanical manipulator according to claim 1, wherein said substrate is composed of a silicon wafer, said plate of polysilicon and said metal layer of gold; wherein all the components of said manipulator are integrated on a semiconductor chip; and wherein said substrate has a valve opening beneath said free end of the manipulator arm and said free end is designed in such a manner that in an unheated state it closes said valve opening.

15. A micromechanical manipulator according to claim 1, wherein said substrate is composed of a silicon wafer, said plate of polysilicon and said metal layer of gold; wherein all the components of said manipulator are integrated on a semiconductor chip; and wherein said substrate has at least one shutter aperture beneath said free end of said manipulator arm and said free end is designed in such a manner that in an unheated state it covers said shutter aperture.

16. A micromechanical manipulator according to claim 1, wherein said substrate is composed of a silicon wafer, said plate of polysilicon and said metal layer of gold; wherein all the components of said manipulator are integrated on a semiconductor chip; and wherein said substrate has at least one shutter aperture beneath said free end of said manipulator arm and said free end is designed in such a manner that in an unheated state it covers said shutter aperture.

17. A micromechanical manipulator according to claim 1, wherein said substrate is composed of a silicon wafer, said plate of polysilicon and said metal layer of gold; wherein all the components of said manipulator are integrated on a semiconductor chip; and wherein said manipulator arm is designed as the drive means for a movable component.

18. A micromechanical manipulator according to claim 17, wherein at least two manipulator arms are disposed tangentially about a rotating toothed disk on a substrate and said free ends of said manipulator arms are designed as hooks which engage teeth of said toothed disk.

19. A micromechanical manipulator according to claim 18, wherein two micromanipulators are disposed perpendicular to one another tangentially about said rotating toothed disk and said toothed disk has six teeth evenly distributed around the circumference of said disk, the length of said teeth being selected in such a manner that a manipulator arm can engage a tooth only when the latter is pointing approximately in the direction of said manipulator arm.

* * * * *